United States Patent Office 3,546,184
Patented Dec. 8, 1970

3,546,184
ADDUCTS FROM MALEIC ANHYDRIDE AND LOW-MOLECULAR WEIGHT POLYBUTADIENE AND THE METHOD OF PREPARATION
Klaus Heidel and Walter Dittmann, Marl, Germany, assignors to Chemische Werke Huls A.G., Marl, Germany
No Drawing. Filed Feb. 18, 1966, Ser. No. 528,376
Claims priority, application Germany, Feb. 20, 1965, C 35,140
Int. Cl. C08f 15/36
U.S. Cl. 260—78.4
8 Claims

ABSTRACT OF THE DISCLOSURE

Adducts of high-cis polybutadiene of 30–30,000 centipoises at 50° C. and maleic anhydride are prepared in the presence of a copper inhibitor, resulting in drying oils of relatively low viscosities and relatively rapid drying times.

---

This invention relates to improved adducts and compositions from maleic anhydride and low molecular weight polybutadiene and the methods of preparation.

Compositions based on polymers of butadiene modified with less than 2% maleic anhydride are known in the prior art such as those disclosed in U.S. Pat. No. 2,876,207, the disclosure of which is incorporated herein.

According to the present invention improved adducts of maleic anhydride and low molecular weight polybutadiene are made by reacting from about 0.1% up to about 70% by weight of maleic anhydride, preferably 0.5 to 50% by weight of maleic anhydride, with polybutadiene containing at least 50% and preferably more than 70% cis-1,4 structural configuration. The polybutadiene raw materials useful in the present invention, for example, are disclosed in Belgian Pat. No. 630,428. The preparation and use of the maleic anhydride of the present invention is disclosed in Kirk & Othmer Encyclopedia of Chemical Technology (1952), vol. 8, pp. 680–696.

The adducts of the present invention are reaction products of polybutadiene with maleic anhydride wherein the polybutadiene has more than 50% and preferably more than 70% cis-1,4 double bond configuration.

In the present invention new and unexpected results have been obtained in preventing gelation and controlling the viscosity of the polybutadiene-maleic anhydride adducts by using copper and/or copper compounds as inhibitors.

It is an object of the present invention to provide an improved adduct of polybutadiene and maleic anhydride having more than 0.1% maleic anhydride.

Another object of the invention is a graft copolymer of polybutadiene and maleic acid.

A further object of the present invention is the control of viscosity and prevention of gelation in adducts of polybutadiene and maleic acid.

Other objects of the invention are the improved coating compositions and films obtained by the improved adducts.

Still other objects of the invention are the improved hardeners for polyepoxides, alkyd resins, and adhesives resulting from the adducts.

Further objects and the broad scope of applicability of the invention will become obvious from a review of the specification and claims.

The adducts of the present invention are useful as air and oven drying coating compositions and adhesives. They have improved drying properties and improved adhesion and resistance to chemical and atmospheric conditions as compared to the prior art products. The adducts are also useful for the production of alkyd resins, water-soluble coating compositions, and as hardeners for polyepoxides.

By cross-linking with di- or poly-functional compounds, such as polyols (polyhydric alcohols), polymercaptans, polyamines, polyphenols, and others, coatings or molded parts are obtained. The properties are varied within wide limits by the selection of the anhydride content and the cross-linking components.

According to the prior art, so-called maleinized oils are prepared by the chemical addition of maleic anhydride to unsaturated natural oils, such as wood oil, linseed oil, oiticica oil, or soya oil. These oils can contain conjugated or isolated double bonds and are used as coatings and adhesive having improved properties. The free fatty acids upon which these oils are based and resinic acids, such as abietic acid, can also be reacted. In comparison to unmodified starting oils, maleinized oils thicken more rapidly at higher temperatures and are more readily processed to stand oils. Their films exhibit an improved adhesiveness and resistance to atmospheric influences. The drying properties, the chemical resistance, the compatibility with pigments and the stability during storage, still leave something to be desired. A further disadvantage of the natural oils is their variable composition resulting from their source of origin.

In order to avoid the disadvantages of the prior art attempts have been made to substitute synthetic compounds for the natural oils. Compounds having conjugated double bonds have been used to produce polymers suitable as film materials or bonding agents for rapid-drying paints. Polymers and copolymers having centrally positioned trans-double bonds and vinyl groups have been produced from 1,3-butadiene, as well as, for isoprene, 1,2-, 1,4-cis- or 1,4-trans-polyisoprene. These polymers have not gained any commercial importance in the manufacture of air-drying paints. They can be baked or stove-enameled only at elevated temperatures, normally above 150° C., preferably above 200° C., and yield films having unsatisfactory properties.

Attempts have been made to add maleic anhydride or other cyclic unsaturated acid anhydrides chemically to polymeric oils, in order to improve the film properties.

According to prior art Belgian Pat. No. 617,612, corresponding to French Pat. No. 1,332,596, the cyclic unsaturated acid anhydrides are added to polymeric oils having a comparatively low content in cis-1,4-bonds. In order to avoid gelling, the anhydrides are added in the presence of 0.1 to 5% of polymerization inhibitors. Preferred inhibitors are tert.-amyl hydroquinone, hydroquinone, diphenylamine, and 2,6-di-tert.-butyl-4-methylphenol. Such inhibitors, even in small amounts, substantially prevent the air-drying process, or at least delay the process considerably. As a result, comparatively high baking temperatures must be maintained, and this must be considered as a further disadvantage experienced with the present state of the art.

Finally, the conversion of the polymer with the aid of maleic anhydride according to the above-mentioned conventional process is never quantitative, and unconverted maleic anhydride must be continuously removed from the viscous polymer mass.

The prior art adducts can be used solely for producing relatively thin films because of their deficient air-drying properties. When films having a thickness of 0.0025 to 0.05 mm. are prepared they must be baked at temperatures above 200° C., and for films having a thickness of 0.125 to 0.375 mm. temperatures up to 370° C. are required. Consequently, the technical utility of the products is substantially limited.

According to the present invention it is possible to produce adducts having improved properties from maleic anhydride and liquid low-molecular weight polybutadiene having a viscosity of 30 to 30,000, preferably 80 to 10,000 centipoises/50° C. by heating polybutadiene containing more than 50%, preferably more than 70% cis-1,4 double bonds with maleic acid anhydride in the presence of copper and/or copper compounds.

The polybutadiene to be used in accordance with the invention can contain, in addition to the cis-1,4 double bonds, also trans-1,4 and/or vinyl-1,2 double bonds. Particularly useful are polybutadienes having the following properties:

Structure:
  70-90% centrally positioned cis-1,4 double bonds
  10-30% centrally positioned trans-1,4 double bonds
  Less than 3% vinyl-1,2 double bonds.
Viscosity: 150-5,000 centipoises/50° C.
Density: $d_4^{50}$: 0.885-0.895
Iodine Number: 400-470

The maleic anhydride is added to the polybutadiene containing more than 50%, preferably more than 70%, centrally positioned cis-1,4 double bonds, under very simple reaction conditions. The polybutadiene is charged, together with the desired quantity of maleic anhydride and a small amount of copper and/or copper compounds, into a flask having agitation means. The mixture is heated to temperatures of 130-220° C., preferably 160-200° C. in the presence of an inert gas, such as nitrogen or carbon dioxide circulated into the flask and through the mixture. The reaction is terminated within 1 to 5 hours, depending upon the quantity of the acid anhydride. The maleic anhydride conversion is almost quantitative. The conversion reaction can be controlled by observation in a simple manner by extraction and titration of the unconverted maleic anhydride. The titration is performed on the adducts dissolved in suitable solvents, such as chlorinated hydrocarbons or aromatics. In addition to the copper which is advantageously employed in finely divided form, the following copper compounds can be used, for example: organic copper salts, such as copper naphthenate, oleate, octoate, maleate, and acetate, copper chelate complexes with acetylacetone, acetylacetic acid ester (ethyl acetate), malonic ester, salicylic aldoxime, anthranilic acid, nitrilotriacetic acid, and amines. Furthermore, inorganic copper salts, such as cuprous and cupric chloride, cuprous bromide, cuprous iodide, and cyanide of copper are used.

The quantity of copper or copper compounds is selected so that the adducts generally contain 0.005-0.5%, preferably 0.01-0.3% of copper.

The adducts produced according to the present invention can have incorporated therein up to 70% by weight of maleic anhydride. With increasing anhydride content, the viscosity increases. Depending upon the viscosity of the starting polymer, these adducts are fluid at lower quantities of anhydride and are viscous to solid in the case of higher quantities of anhydride. For example, a polybutadiene having 79% cis-1,4, 20% trans-1,4, and 1% 1,2-double bonds, as well as an iodine number of 449, a $d_4^{20}$ density of 0.8906, a viscosity of 240 centipoises/50° C., and a molecular weight of 1,800, measured by means of vapor pressure osmosis, yields products which are fluid up to an anhydride content of about 40% and solid above a content of 40%. The density ($d_4^{20}$) of the adducts ranges, depending upon the anhydride content, between 0.895 and 1.3, and the iodine numbers between 460 and 120.

The adducts are soluble in aliphatic hydrocarbons, such as test benzine, cycloaliphatic hydrocarbons, such as cyclohexane, and isopropylcyclohexane, in aromatic hydrocarbons, such as benzene, toluene, xylene, cumene, and styrene, in chlorinated hydrocarbons, such as chloroform, tetrachloroethylene, and chlorobenzene, in esters, such as ethyl acetate, butyl acetate, methyl glycol acetate, and methyl acrylate, in ketones, such as acetone, methyl-ethyl ketone, or cyclohexane, in ethers, such as dioxane or dibutyl ether, as well as in alcohols, such as butanol, octanol, or cyclohexanol, and in mixtures of these solvents. The concentration of the adducts in the solvents may vary from 5% to 90% with a preferred concentration useful in coating compositions of 20% to 60% by weight. Sometimes it may be advantageous using the adducts without solvents.

When the addition reaction is conducted in the absence of copper and/or copper compounds, the products begin to gel during their manufacture. At an anhydride content of 2.9%, the viscosity is almost double as high as in an adduct produced in accordance with this invention wherein 0.02% copper in the form of copper naphthenate is present. The addition of 4 to 5% of maleic anhydride, without the addition of copper or copper compounds leads to products which are not completely soluble and which are unusable for further processing.

In the presence of polymerization inhibitors, such as described in Belgian Pat. No. 617,612, soluble products can be produced with a somewhat higher anhydride content. However, the viscosities of these products are substantially higher than those of adducts produced in the presence of the copper and/or copper compounds of the present invention. For example, in the case where the adduct formation is conducted in the presence of hydroquinone, a viscosity of 8,000 centipoises/50° C. is obtained with an anhydride content of about 10%. In the presence of copper naphthenate, a viscosity of only 2,700 centipoises/50° C. is obtained. When more than 20% maleic anhydride is added in the presence of hydroquinone, cross-linked and thus unusable products are produced. Other known stabilizers, such as 2,5-di-tert.-butylbenzoquinone are completely unsuitable, since cross-linking occurs when very minor amounts of maleic anhydride are added to polybutadiene.

In contradistinction to the use of such prior art polymerization inhibitors, an important and preferred embodiment of this invention is that maleic anhydride is added to polybutadiene containing at least 50%, preferably more than 70% cis-1,4 bonds, in the presence of copper and/or copper compounds and the products are soluble, not cross-linked, with an anhydride content up to 70%. The lower viscosities of the adducts of the present invention are new and unexpected as compared to the viscosities obtained with the addition of hydroquinone and are of great advantage when using the adducts. For example, the adducts can be modified to a greater extent with pigments and other additives.

Particularly significant is the advantage of the products of the present invention in the field of the airdrying adhesives. Hydroquinone, and other inhibitors, such as described in Belgian Pat. No. 617,612, in minute quantities prevent or delay the air-drying procedure, whereby practically all fields of utility are eliminated wherein air-drying is required. In many cases, for example when the adducts are used as hardeners for polyepoxides, high anhydride contents are desired and these anhydride contents cannot be obtained in the presence of the prior art hydroquinone and similar inhibitors.

In order to illustrate the advantages of the present invention, the following examples and comparative examples are submitted.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLES 1 to 24

500 g. of a liquid polybutadiene (polybutadiene I) having the following properties are heated at 100° C. for one hour in a three-necked flask with agitation and under a nitrogen atmosphere:

| | |
|---|---:|
| Viscosity, centipoises/50° C. | 240 |
| Density, $d_4^{20}$ g./ml. | 0.8906 |
| Iodine number, g. of iodine/100 g. | 449 |
| Molecular weight, measured by means of vapor pressure osmosis | 1,800 |
| Structure, percent: | |
|    Centrally positioned cis-1,4 double bonds | 79 |
|    Centrally positioned trans-1,4 double bonds | 20 |
|    Vinyl-1,2 double bond | 1 | along with the quantities stated in Table 1 of copper naphthenate (copper content 9%), Examples 1–9; powdered copper, Example 10; copper acetonyl acetonate, Example 11; as well as, for purposes of comparison, with hydroquinone, Examples 12–17; without inhibitor, Examples 18–21 and with 2,5-di-tert.-butylbenzoquinone, Examples 22–24. The quantities of maleic anhydride set forth in Table I are then added with care to avoid the admission of air. The temperature is increased to 180° C. with stirring and the circulation of nitrogen over the reaction mixture. The reaction is continued during this time. After a reaction time of 15 minutes, the heterogeneous mixture of maleic anhydride and polybutadiene is converted into a clear, homogeneous solution. The conversion of maleic anhydride is determined by withdrawing a small amount from the reaction mixture and dissolving this amount in triple the quantity of carbon tetrachloride. After extraction with water, the quantity of the unreacted extracted maleic anhydride is determined in the separated aqueous phase by titration. The reaction is interrupted when the conversion of the maleic anhydride is almost quantitative. The reaction period is 2.5 to 3 hours at 180° C.

The following properties of the adducts were determined:
(1) Viscosity in centipoises at 50° C.
(2) Iodine number in g. iodine per 100 g. of adduct.
(3) Solubility in toluene, butyl acetate, carbon tetrachloride, and ether.

Table I clearly shows several advantages of the adducts produced in accordance with the invention. In the presence of powdered copper, copper naphthenate or acetyl acetonate, soluble, not cross-linked adducts are produced having a far larger content of maleic anhydride than the prior art adducts produced in the presence of equal quantities of hydroquinone. The adducts of the present invention furthermore exhibit substantially lower viscosities than the adducts produced in the presence of hydroquinone.

EXAMPLES 25 to 35

The following examples demonstrate the substantially better air-drying properties of the adducts of the present invention produced in the presence of copper compounds, as compared to the prior art adducts produced in the presence of hydroquinone.

In the production of the adducts, the following polybutadienes are employed, in addition to the polybutadiene I having a viscosity of 240 centipoises/50° C. used in Examples 1 to 24:

Polybutadiene II:

| | |
|---|---:|
| Viscosity, centipoises/50° C. | 150 |
| Density, $d_4^{20}$, g. per ml. | 0.890 |
| Iodine number, g. of iodine per 100 g. | 445 |
| Oxygen content, percent | 0.7 |
| Ash content, percent | <0.1 |
| Structure, percent— | |
|    Centrally positioned cis-1,4 double bonds | 76 |
|    Centrally positioned trans-1,4 double bonds | 23 |
|    Vinyl-1,2 double bonds | 1 |

Polybutadiene III:

| | |
|---|---:|
| Viscosity, centipoises/20° C. | 3,740 |
| Density, $d_4^{20}$ | 0.91 |
| Iodine number, g. of iodine per 100 g. | 436 |
| Ash content, percent | 0.050 |
| Structure, percent— | |
|    Centrally positioned cis-1,4-double bonds | 85 |
|    Centrally positioned trans-1,4 double bonds | 14 |
|    Vinyl-1,2 double bonds | 1 |

Respectively 500 g. of these polybutadienes are converted in the same manner as in Examples 1–24 with the amounts of maleic anhydride set forth in Table 2, in the presence of copper naphthenate or hydroquinone.

Respectively, 100 g. of the adducts are mixed with 0.625 g. cobalt octoate (16% cobalt) corresponding to 0.1 g. cobalt (drier I) or 0.565 g. cobalt octoate (16% cobalt) 0.945 g. manganese octoate (11% manganese) and 1.79 g. lead octoate (31% lead), corresponding to 0.0904 g. cobalt, 0.104 g. manganese, and 0.556 g. lead the metals being at a weight proportion of $$1.3:1.5:8 = Co:Mn:Pb$$

(drier II), and then these 100 g. portions of the adducts are dissolved in test benzine so that solutions are obtained having a 50% solids content. From these solutions, films of a thickness of 300µ are produced by applying the so-

TABLE 1

| Example No. | Maleic acid anhydride Amount in g. | Maleic acid anhydride Percent in the adduct | Stabilizer Type | Stabilizer Amount in g. | Stabilizer Percent in the adduct | Viscosity, centipoises/ 50° C. | Iodine Number, actual | Iodine Number, Desired | Solubility behavior in toluene, butyl acetate, carbon tetrachloride and ether |
|---|---|---|---|---|---|---|---|---|---|
| 1 | 15 | 2.9 | Copper naphthenate | 1.03 | 0.20 | 640 | 438 | 436 | Soluble. |
| 2 | 30 | 5.7 | ...do... | 1.06 | 0.20 | 850 | 404 | 423 | Do. |
| 3 | 45 | 8.3 | ...do... | 1.09 | 0.20 | 1,200 | 420 | 412 | Do. |
| 4 | 60 | 10.7 | ...do... | 1.12 | 0.20 | 2,700 | 375 | 401 | Do. |
| 5 | 100 | 16.7 | ...do... | 1.50 | 0.25 | 14,000 | 388 | 374 | Do. |
| 6 | 150 | 23.1 | ...do... | 1.95 | 0.30 | 86,000 | 322 | 346 | Do. |
| 7 | 250 | 33.3 | ...do... | 2.25 | 0.30 | 900,000 | 306 | 300 | Do. |
| 8 | 340 | 40.5 | ...do... | 2.52 | 0.30 | 42,000/80° | 255 | 267 | Do. |
| 9 | 500 | 50.0 | ...do... | 3.00 | 0.30 | Solid | 189 | 225 | Do. |
| 10 | 100 | 16.7 | Powdered Cu | 1.80 | 0.30 | 16,400 | 418 | 374 | Do. |
| 11 | 100 | 16.7 | Cupric acetylacetonate | 1.80 | 0.30 | 7,900 | 410 | 374 | Do. |
| 12 | 15 | 2.9 | Hydroquinone | 1.03 | 0.20 | 1,200 | 423 | 436 | Do. |
| 13 | 30 | 5.7 | ...do... | 1.06 | 0.20 | 2,000 | 456 | 423 | Do. |
| 14 | 45 | 8.3 | ...do... | 1.09 | 0.20 | 5,300 | 416 | 412 | Do. |
| 15 | 60 | 10.7 | ...do... | 1.12 | 0.20 | 8,000 | 407 | 401 | Do. |
| 16 | 100 | 16.7 | ...do... | 1.80 | 0.30 | 49,000 | 341 | 374 | Do. |
| 17 | 150 | 23.1 | ...do... | 1.95 | 0.30 | | | | Cross-linked. |
| 18 | 15 | 2.9 | ...do... | | | 1,200 | 432 | 436 | Soluble. |
| 19 | 30 | 5.7 | ...do... | | | | | | Partially cross-linked. |
| 20 | 45 | 8.3 | ...do... | | | | | | Do. |
| 21 | 60 | 10.7 | ...do... | | | | | | Cross-linked. |
| 22 | 15 | 2.9 | 2.5 di-tert. butylbenzoquinone | 1.03 | 0.20 | 3,600 | 426 | 436 | Soluble. |
| 23 | 30 | 5.7 | ...do... | 1.06 | 0.20 | | | | Partially cross-linked. |
| 24 | 45 | 8.3 | ...do... | 1.09 | 0.20 | | | | Cross-linked. | lution to steel sheet base materials. The drying times are determined according to the sand spreading method, effecting at room temperature a dust dry film.

Table 2 demonstrates that the adducts of the present invention in the presence of copper naphthenate with maleic anhydride contents of 3 to 6% yield dust dry films within 10 to 12 hours. At higher maleic anhydride contents of 6 to 11% dust dry films are produced in 6 hours.

In contradistinction thereto, lacquer films from prior art adducts produced in the presence of hydroquinone require, in connection with drier I, drying times of more than 48 hours, and with drier II, drying times of 19 hours.

double bond configuration and a viscosity of 30 to 30,000 centipoises measured at 50° C.;
(b) 0.1–70% by weight maleic anhydride; and
(c) 0.005–05% by weight of an inhibitor selected from the group consisting of particulate copper, copper salts or copper chelate complexes.

6. The process of claim 5, wherein said heating is carried out at a temperature between 160 and 200° C.;
(a) has a viscosity of 80 to 10,000 centipoises measured at 50° C.;
(b) has a concentration of about 0.5% up to about 50%; and
(c) has a concentration of about 0.01 to 0.3% by weight.

TABLE 2

| Example No. | Polybutadiene | Maleic acid anhydride | | | Stabilizer | | Drying period, hours | |
|---|---|---|---|---|---|---|---|---|
| | | Amount in g. | Percent in the adduct | Type | Amount in g. | Percent in the adduct | Drier I | Drier II |
| 25 | II—150 centipoises | 25 | 4.76 | Copper naphthenate | 0.525 | 0.1 | 12 | 12 |
| 26 | I—240 centipoises | 25 | 4.76 | do | 1.05 | 0.2 | 12 | 12 |
| 27 | do | 40 | 7.41 | do | 1.08 | 0.2 | 10 | 10 |
| 28 | III—3,740 centipoises | 15 | 2.9 | do | 1.03 | 0.2 | 12 | 12 |
| 29 | do | 30 | 5.7 | do | 1.06 | 0.2 | 10 | 10 |
| 30 | do | 45 | 8.3 | do | 1.09 | 0.2 | 7 | 8 |
| 31 | do | 60 | 10.7 | do | 1.12 | 0.2 | 6 | 7–8 |
| 32 | do | 15 | 2.9 | Hydroquinone | 1.03 | 0.2 | >48 | 19 |
| 33 | do | 30 | 5.7 | do | 1.06 | 0.2 | >48 | 19 |
| 34 | do | 45 | 8.3 | do | 1.09 | 0.2 | >48 | 19 |
| 35 | do | 60 | 10.7 | do | 1.12 | 0.2 | >48 | 19 |

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An adduct of polybutadiene and 0.1–70% by weight maleic anhydride wherein said polybutadiene has more than 50% cis-1,4 double bond configuration and a viscosity of 30–30,000 centipoises at 50° C., said adduct containing 0.005–5% by weight of particulate copper, copper salts or copper chelate complexes and being characterized by relatively low viscosities and by relatively rapid drying times and having been prepared in the presence of said copper, copper salts or copper chelate complexes.

2. The adduct of claim 1, wherein said polybutadiene has more than about 70% cis-1,4 double bond configuration.

3. The adduct of claim 1, having about 2.9% up to about 70% by weight maleic anhydride.

4. The adduct of claim 2, having about 2.9% up to about 50% by weight maleic anhydride.

5. A process for the production of adducts from polybutadiene and maleic anhydride comprising heating at 130–220° C. a composition of:
(a) polybutadiene having more than about 50% cis-1,4

7. An adduct as defined by claim 1 wherein said polybutadiene has the following properties:

Structure:
    70–90% centrally positioned cis-1,4 double bonds;
    10–30% centrally positioned trans-1,4 double bonds;
    less than 3% vinyl-1,2 double bonds.
Viscosity: 150–5,000 centipoises/50° C.
Density: $d_4^{50}$: 0.885–0.895.
Iodine Number: 400–470.

8. A process as defined by claim 5 wherein said polybutadiene has the following properties:

Structure:
    70–90% centrally positioned cis-1,4 double bonds;
    10–30% centrally positioned trans-1,4 double bonds;
    less than 3% vinyl-1,2 double bonds.
Viscosity: 150–5,000 centipoises/50°C.
Density: $d_4^{50}$: 0.885–0.895.
Iodine Number: 400–470.

References Cited

UNITED STATES PATENTS

| 2,826,618 | 3/1958 | Gleason | 260—78.4D |
| 2,844,502 | 7/1958 | Paxton | 260—78.4D |
| 2,933,468 | 4/1960 | Aldridge et al. | 260—78.4D |
| 3,028,360 | 4/1962 | Brooks et al. | 260—863 |

FOREIGN PATENTS

| 952,021 | 3/1964 | Great Britain | 260—94.7 |

JOSEPH L. SCHOFER, Primary Examiner

R. A. GAITHER, Assistant Examiner

U.S. Cl. X.R.

260—879

UNITED STATES PATENT OFFICE
CERTIFICATE OF CORRECTION

Patent No. 3,546,184  Dated December 8, 1970

Inventor(s) KLAUS HEIDEL and WALTER DITTMANN

It is certified that error appears in the above-identified patent and that said Letters Patent are hereby corrected as shown below:

Column 8, Line 4, change "0.005-05%" to ---0.005-0.

Signed and sealed this 4th day of May 1971.

(SEAL)
Attest:

EDWARD M. FLETCHER, JR.
Attesting Officer

WILLIAM E. SCHUYLER, JR
Commissioner of Patents